United States Patent
Witzigreuter et al.

(10) Patent No.: US 6,461,763 B1
(45) Date of Patent: Oct. 8, 2002

(54) BATTERY CARTRIDGE

(75) Inventors: John D. Witzigreuter, Kennesaw, GA (US); Christopher S. Pedicini, Roswell, GA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/482,374

(22) Filed: Jan. 13, 2000

(51) Int. Cl.[7] .......................... H01M 2/00; H01M 2/02; H01M 6/08
(52) U.S. Cl. .................. 429/163; 429/174; 429/177
(58) Field of Search ......................... 429/163, 174, 429/175, 176, 177

(56) References Cited

U.S. PATENT DOCUMENTS

| | | | | |
|---|---|---|---|---|
| 2,843,650 A | * | 7/1958 | Jacquier | 429/163 |
| 4,238,555 A | * | 12/1980 | Uetani et al. | 429/163 |
| 4,460,663 A | | 7/1984 | Stutzbach et al. | 429/151 |
| 4,487,819 A | * | 12/1984 | Koga | 429/82 |
| 4,904,559 A | * | 2/1990 | Kano et al. | 429/163 |
| 4,996,128 A | * | 2/1991 | Aldecoa et al. | 429/153 |
| 5,458,988 A | | 10/1995 | Putt | 429/27 |

* cited by examiner

Primary Examiner—Patrick Ryan
Assistant Examiner—Julian A. Mercado
(74) Attorney, Agent, or Firm—Fish & Richardson P.C.

(57) ABSTRACT

A battery cartridge includes a first casing having a wall; and a second casing having an outer wall having a height, and an inner wall having a height less than the height of the outer wall, wherein the walls of the second casing are spaced for receiving the wall of the first casing.

52 Claims, 5 Drawing Sheets

BATTERY CARTRIDGE

BACKGROUND

The invention generally relates to a cartridge for a metal air battery.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a sheet-like layer, typically called the separator.

When a battery is used as an electrical energy source in a device, such as a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In a metal air electrochemical cell, oxygen is reduced at the cathode, and a metal is oxidized at the anode. Oxygen is supplied to the cathode from the atmospheric air external to the cell through one or several air access port(s) in the container.

In a prismatic metal-air electrochemical cell, a cartridge is typically used a battery housing. The cartridge allows air to reach the cathode to drive the electrochemical reactions. The cartridge also keeps the cathode electrically isolated from the anode, which can sometimes leak from the cell.

SUMMARY OF THE INVENTION

The invention generally relates to a battery cartridge that provides good protection against leakage of battery material. The cartridge can be used with batteries used in devices such as cellular telephones.

In one aspect, the invention features a battery including a cartridge having a first casing having a wall; and a second casing having an outer wall having a height, and an inner wall having a height less than the height of the outer wall, wherein the walls of the second casing are spaced for receiving the wall of the first casing. Preferably, the wall of the first casing extends entirely around the periphery of the first casing. In addition, the outer wall of the second casing extends entirely around the periphery of the second casing, and/or the inner wall of the second casing extends entirely around the second casing. With such a cartridge, a simple, two-piece design is provided. This design helps to minimize cost of production and simplifies the manufacturing and assembling process.

The first casing can include an area recessed from an interior surface of the first casing such that a cathode can be disposed on the interior surface of the casing. An absorbent layer can be disposed within the recessed area of the casing. By placing the absorbent layer into the recessed area, the cathode can be directly sealed to the casing. The direct seal between the cathode and the casing reduces the chance of leakage at this point. In addition, this allows the cathode to lie more flatly which increases the internal volume of the battery.

The battery also includes at least one seal between the first casing and the second casing. The seal can be located between an end of the wall of the first casing and the second casing. For example, the end of the wall of the first casing can have a projection. This projection can be ultrasonically welded to form a seal between the wall of the first casing and the second casing. A seal can further be located between the outer wall of the second casing and the wall of the first casing. The seal can be an adhesive, e.g., an epoxy-potting compound. The battery further includes a cathode disposed in the first casing. When the casings are assembled together, the cathode is compressed against an end of the inner wall of the second casing. The battery can include a seal disposed between the end of the inner wall of the second casing and the cathode. Preferably, the battery has all three seals, thereby providing good protection against leakage of the battery material.

By assembling the battery such that the cathode is compressed against the inner wall of the second casing, the internal volume of the battery is increased. This provides for more space for anode material which results in increased capacity of the battery. The cartridge also requires no hot melt for sealing and eliminates use of a grid.

In another aspect, the invention features a method of assembling a battery. The method provides a simple manufacturing and assembly process. The method includes placing a cathode in a first casing having a wall; placing an anode material in a second casing having an outer wall having a height, and an inner wall spaced from the outer wall and having a height less than the height of the outer wall; and sealing the first casing and the second casing together such that the wall of the first casing is received between the walls of the second casing.

Sealing of the first casing and the second casing together can be performed by compressing the casings such that the cathode is compressed against an end of the inner wall of the second casing. A sealant can be placed on the end of the wall such that a seal is formed at the periphery of the cathode. The method can further include sealing the first casing to the second casing by forming a seal between the end of the wall of the first casing with the second casing. For example, the end of the wall of the first casing can have a projection, e.g., an energy director. This projection can be welded, e.g., by ultrasonic welding, to the second casing. Sealing of the first casing and the second casing can be performed by placing an adhesive, e.g., an epoxy compound, between the wall of the first casing and the outer wall of the second casing. Preferably, the method includes forming at least these three seals between the first casing and the second casing so that the chance of leakage from the battery is reduced.

DESCRIPTION OF THE PREFERRED EMBODIMENTS

Referring to FIGS. 1–4, a metal air battery 10 includes a cartridge 20 having a first casing 30 and a second casing 40, configured to form a prismatic cartridge when assembled. Casings 30, 40 can be made by known techniques, such as injection molding. Preferably, casings 30, 40 are made from a non-conductive material such as a thermoplastic, e.g., acetylene-butylene-styrene (ABS). Inside the cartridge, battery 10 can also include a sealant 60, an absorbent layer 70, a cathode 80, an anode material 90, and/or an anode current collector 100.

Figure 1:
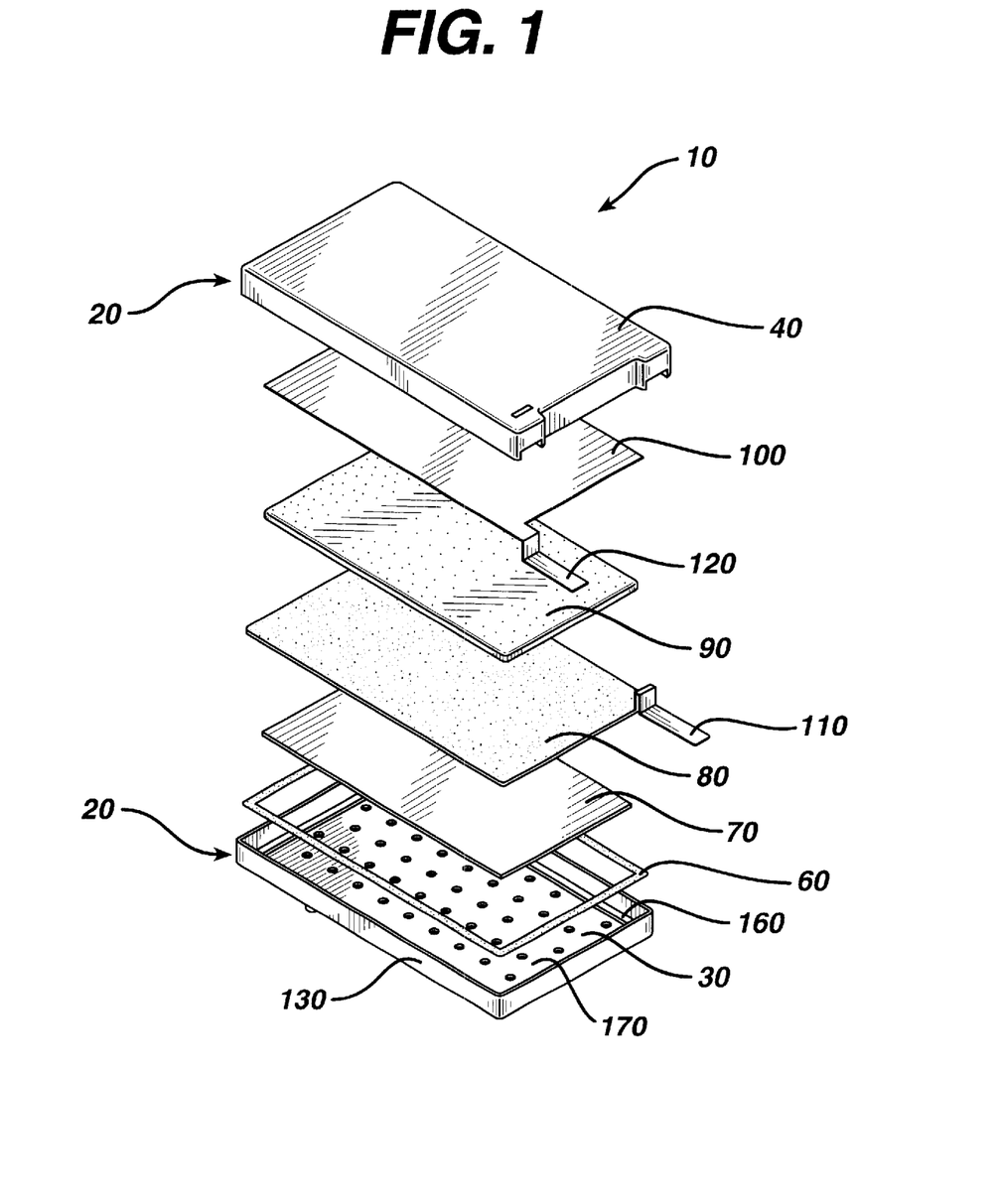
FIG. 1 is an exploded view of a metal air battery having a cartridge of the invention.
Figure 2:
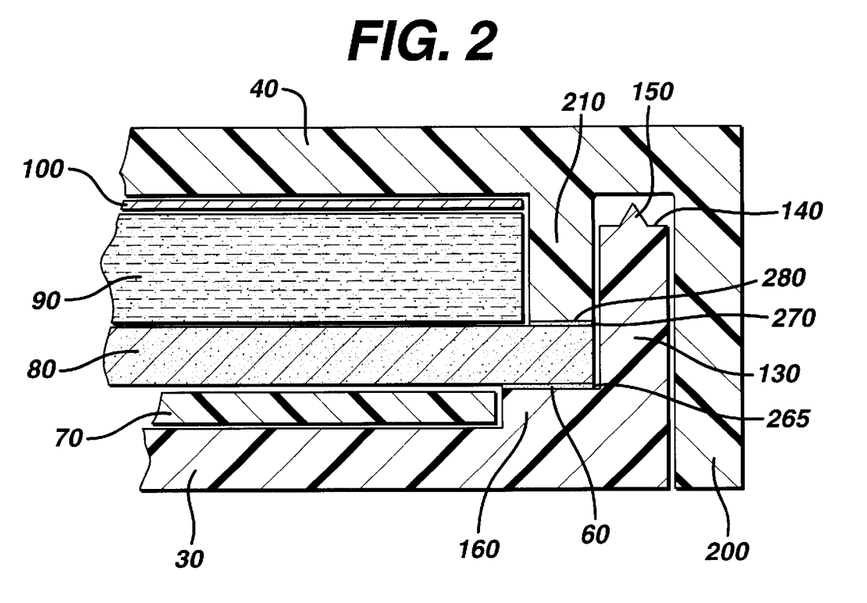
FIG. 2 is cross-sectional view of an assembled, pre-connected metal air battery having a cartridge of the invention.

Referring to FIGS. 1 and 2, first casing 30 is configured as a rectangle having a wall 130 extending around the periphery of the rectangle. A typical first casing 30 is 69 mm long, 40 mm wide, 5.5 mm high, and 0.8 mm thick. Specific dimensions and configurations, however, depend on the application for the battery. For example, the battery can be configured as a rectangular prism or a circular prism. Wall 130, typically 0.8 mm thick, extends 4.5 mm from a bottom surface of the first casing 30. As shown in FIG. 2, located on the end 140 of the wall 130 are projections 150. These projections 150 can be integrally formed with first casing 30, for example, during injection molding. Projections 150 provide welded seals, e.g., ultrasonically welded seals, between first casing 30 and second casing 40 when the casings are mated, as described below. Typically, 2 to 4 projections 150, 0.010 inch high, are formed on the wall 130. These projections are generally spaced about the periphery of the first casing 30. The number of projections may vary, however, depending on the size and configuration of the casing.

First casing 30 has an interior bottom surface which can have a step 160 and a recessed area 170 defined by the step 160. Step 160 can extend around the first casing 30 adjacent to the interior surface of wall 130. Typically, the step 160 is 1.8 mm wide and 0.3 mm high. As described later, step 160 helps to provide a compression seal when the casings 30, 40 are assembled to form the battery 10. As shown in FIG. 2, absorbent layer 70 is placed in the recessed area 170 to allow the cathode 80 to lie more flatly when the compression seal is made, as described below.

Figure 3:
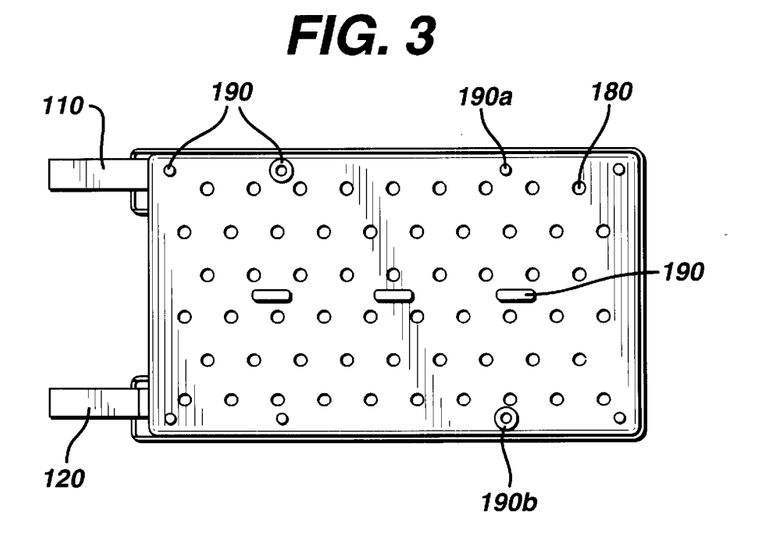
FIG. 3 is a bottom view of a metal air battery having a cartridge of the invention.

As best shown in FIG. 3, first casing 30 further includes a plurality of air access openings 180. Openings 180 can be made during formation of the first casing, e.g., openings can be formed during injection molding of first casing 30. These openings allow air to diffuse into the battery to drive the electrochemical reactions. To provide uniform discharge of battery 10, openings 180 are distributed uniformly on the bottom surface of the first casing 30. Preferably, the openings 180 have a diameter of about 1.75 mm and are about 6 mm apart.

The first casing 30 can further include stand-offs formed on the exterior bottom surface of first casing 30. Stand-offs 190, including pins 190a and sockets 190b, are configured and positioned such that two batteries 10 can be mated together to provide higher voltages. For example, pins 190a of first battery mate with sockets 190b of second battery, and vice versa. The mated batteries typically define an air plenum of about 0.060 inch between them.

Figure 4:
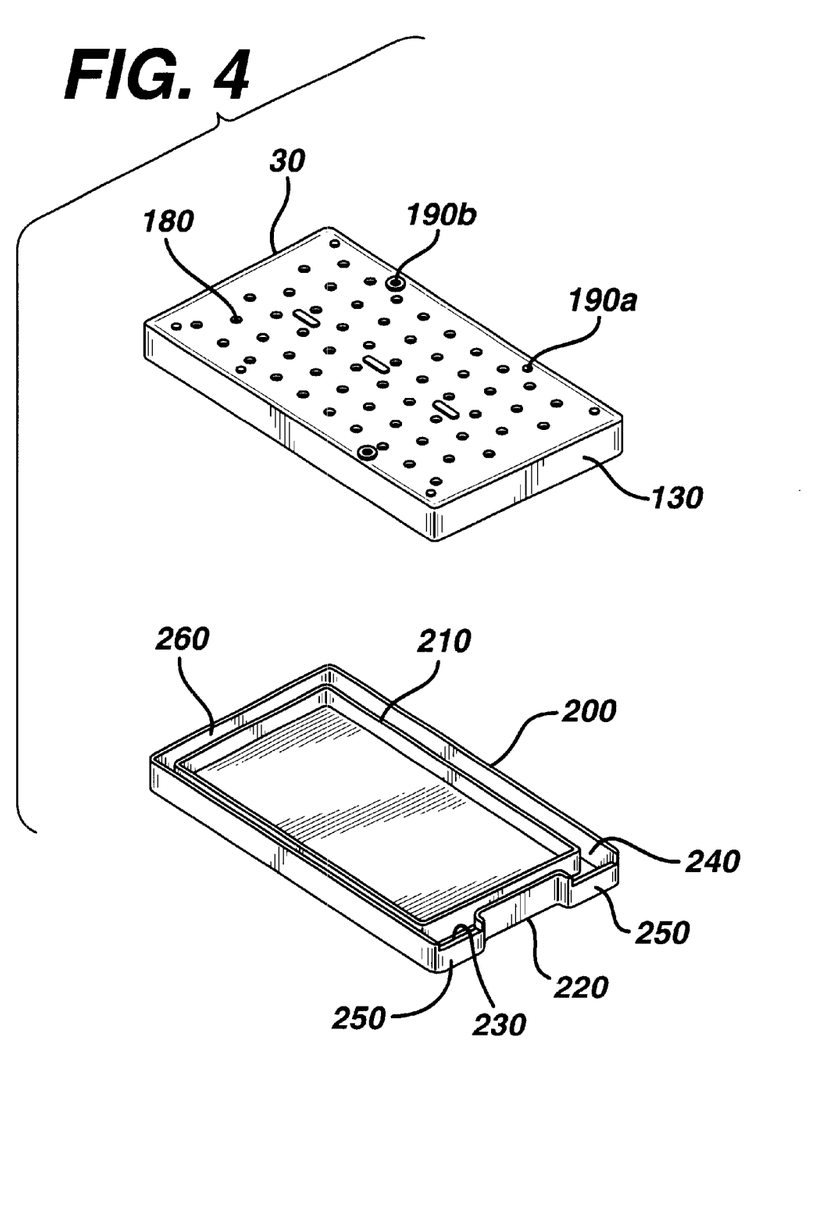
FIG. 4 is an exploded view of the cartridge of the invention.

Referring to FIGS. 2 and 4, second casing 40 includes an outer wall 200 and an inner wall 210 extending around a rectangle. The outer wall 200 can have an indented portion 220 on one of the short sides of the casing 40. The indented portion 220 is preferably 24 mm long and 2 mm wide. Thus, one side of the second casing 40 can have an indented portion and a non-indented portion on either side of the indent. The non-indented portions, also referred to herein as chambers, provide space through which portions of the current collector tab and the cathode tab are disposed, as described below. Outer wall 200, preferably 0.7 mm thick, extends around the periphery of the second casing 40. Inner wall 210, preferably 1.5 mm thick, extends around the second casing 40 spaced from the outer wall 200 to define a rectangular area. As shown in FIG. 2, inner wall 210 has a height less than the height of the outer wall 200. For example, outer wall 200 is 5.5 mm high, and inner wall 210 is 3.6 mm high. Preferably, however, outer wall 200 has a height sufficient to cover wall 130 of first casing 30 when the casings 30, 40 are mated together to form the cartridge. Inner wall 210 has a height sufficient to form a compression seal against the cathode 80 when the casings 30 and 40 are mated together and sealed, as described below. Together, inner wall 210 and outer wall 200 define first chamber 230 and second chamber 240 for the cathode tab 110 and the current collector tab 120, respectively, to extend outside of the battery 10. Accordingly, portions 250 of the outer wall 200 defining chambers 230 and 240 are notched to allow the tabs 110 and 120 to extend outside of the battery 10. The chambers 230 and 240 can also hold an adhesive to provide added protection against leaks. Walls 200 and 210 also define a channel 260, typically 0.8 mm wide, extending around the second casing 40 for receiving the wall 130 of the first casing 30 when the casings 30, 40 are assembled together, as described below.

Battery 10 is assembled generally by placing cathode sheet in the first casing 30, placing anode material in the second casing 40, and mating the two casings 30 and 40 together. First, a sealant border 265 can be placed on the step 160. The sealant can be 626 Asphalt (Pioneer Asphalt Corp. (Lawrenceville, Ill.)). Preferably, the sealant border is about 0.002 to 0.006 inches, more preferably 0.004 inches thick. The sealant border 265 secures the cathode 80 to the step 160 of the first casing 30.

Absorbent layer 70 is placed in recessed area 170. The absorbent layer 70 provides protection from leaks from the battery 10 and can also limit flooding. The absorbent layer 70 can be heat staked at a number of localized areas. Heat staking melts the absorbent layer 70 and the first casing 30 and secures the absorbent layer 70 in place. Preferably, the absorbent layer 70 is Nonwoven Battery Separator Material #7885, available from Hollingsworth & Vose (Charlotte, N.C.).

The cathode 80 is placed over the absorbent layer 70 and on the step 160, as shown in FIG. 2. The cathode 80 can include an active cathode mixture deposited on a current collector, such as a wire screen. The mixture can include a binder, carbon particles, and a catalyst for reducing peroxide. A useful binder includes one formed from polytetrafluoroethylene (PTFE) particles. Useful catalysts include manganese oxides, such as $Mn_2O_3$, $Mn_3O_4$, and $MnO_2$, which can be prepared, for example, by heating manganese nitrate or by reducing potassium permanganate. The outside of the cathode 80, which faces the air access ports, can be covered by a PTFE membrane. The membrane also helps to prevent the electrolyte from leaking out of the cell and $CO_2$ from leaking into the cell.

More asphalt sealant 270, typically 1.2 mm wide, is placed on the top surface of the cathode 80 around the periphery. The sealant 270 helps to provide a seal between the cathode 80 and the end of the inner wall 210 of the second casing 40, as described below.

Anode current collector 100 is placed in the second casing 40. The anode current collector 120 is an expanded grid, preferably made of a corrosion resistant material, such as brass. The anode current collector 100 can be heat staked in a number of localized areas to secure the current collector 100 to the casing 40.

The anode gel material 90 is placed over the anode current collector 100. The anode gel contains a mixture including zinc and electrolyte. The mixture of zinc and electrolyte can include a gelling agent that can help prevent leakage of the electrolyte from the cell and help suspend the particles of zinc within the anode.

The zinc material can be a zinc powder that is alloyed with lead, indium, aluminum, or bismuth. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. Alternatively, the zinc can include lead without other metal additives. The zinc material can be air blown or spun zinc. Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety. The zinc can be a powder. The particles of the zinc can be spherical or non-spherical. For example, the zinc particles can be acicular in shape (having an aspect ratio of at least two).

The gelling agent is an absorbent polyacrylate. Suitable gelling agents are described, for example, in U.S. Pat. No. 4,541,871, U.S. Pat. No. 4,590,227, or U.S. Pat. No. 4,507,438. In certain embodiments, the anode gel can include a non-ionic surfactant, and an indium or lead compound, such as indium hydroxide or lead acetate. Further description of the anode gel is provided in U.S. Ser. No. 09/374,278, filed Aug. 13, 1999, the contents of which is incorporated herein by reference.

The electrolyte can be an aqueous solution of potassium hydroxide. The electrolyte can include between about 30 and 40 percent, preferably between 35 and 40 of potassium hydroxide. The electrolyte can also include between about 1 and 2 percent of zinc oxide.

Figure 5:
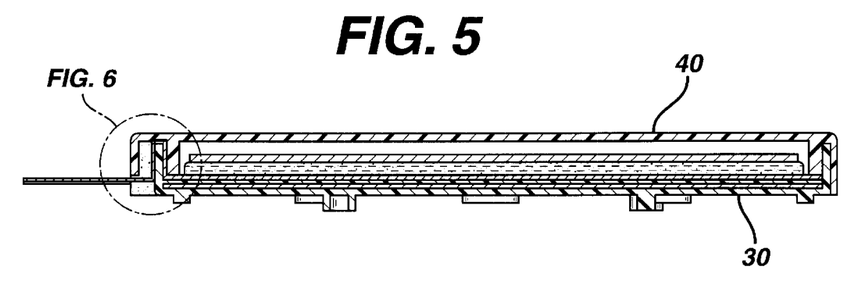
FIG. 5 is a cross-sectional view across a first chamber of a metal air battery having a cartridge of the invention.
Figure 6:
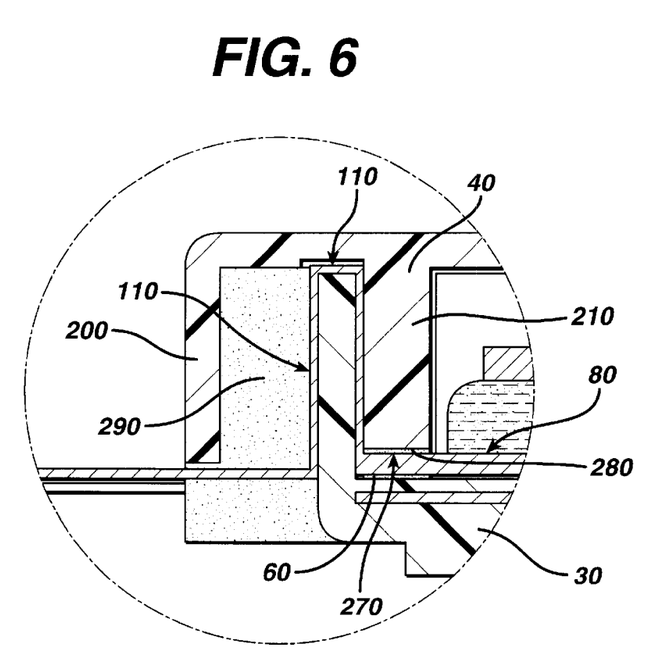
FIG. 6 is a detailed, cross-sectional view of FIG. 5.
Figure 7:
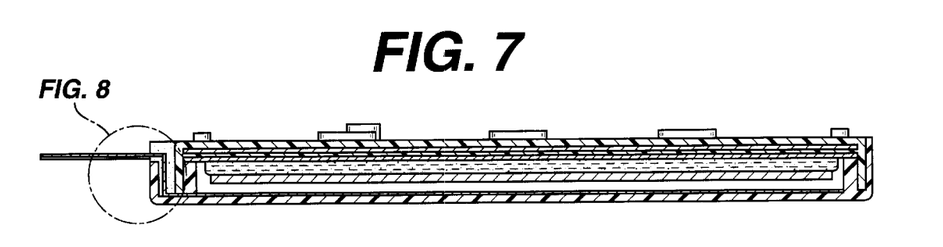
FIG. 7 is a cross-sectional view across a second chamber of a metal air battery having a cartridge of the invention.
Figure 8:
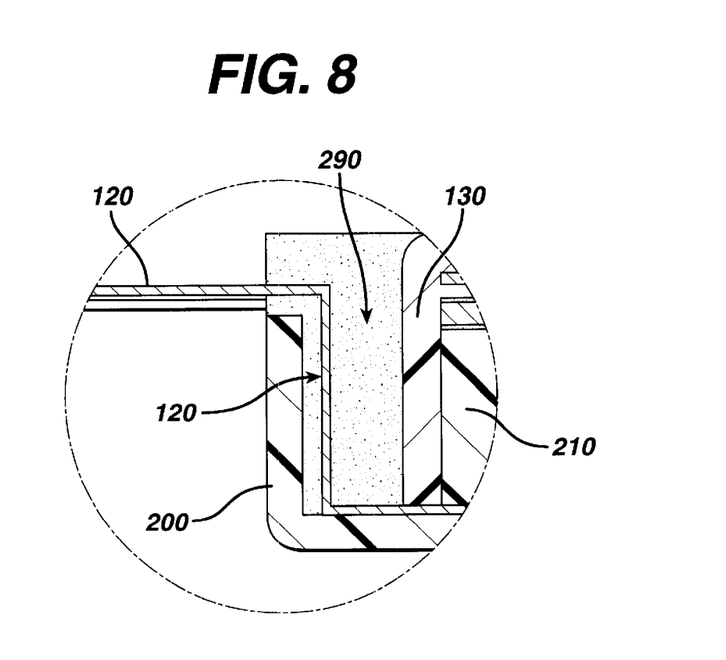
FIG. 8 is a detailed, cross-sectional view of FIG. 7.

The two casings 30, 40, with their respective contents inside, are mated such that the wall 130 of the first casing is received in the channel 260. As shown in FIGS. 5 and 6, when the battery 10 is assembled, cathode tab 110 extends from cathode 80, to between wall 130 of first casing 30 and inner wall 210 of second casing 40, along outer surface of wall 130 of first casing 30, through first chamber 230, and to outside of the battery 10. As shown in FIGS. 7 and 8, anode current collector tab 120 extends from the current collector 100, to between wall 130 of first casing 30 and inner wall 210 of second casing 40, through second chamber 240, and to outside of the battery 10.

Projections 150 located along the end 140 of the wall 130 of the first casing 30 are ultrasonically welded to provide tacking bonds between the casings 30 and 40. During welding, projections 150 act as energy directors and melt from resistive heating. The melted projections form seals between the first casing 30 and the second casing 40. Preferably, the projections 150 are not disposed along end portions of the wall 130 of the first casing 30 that are received in the chambers since the tabs 110 and 120 would obstruct the ultrasonic welding.

Preferably, the projections 150 are formed with an initial height of about 0.010 inch and are welded (and melted) to a final height of about 0.002 inch.

During assembly, the battery 10 is further sealed by a compression seal between the cathode 80 and the end 280 of the inner wall 210 of the second casing 40. As the casings 30 and 40 are mated together and ultrasonically welded, end 280 of inner wall 210 of the second casing 40 compresses sealant 270 against cathode 80, providing a leakage barrier extending around the periphery of the inner wall 210. Mating the casings 30 and 40 together also compresses cathode 80 against sealant 60, and sealant 60 against step 160, further sealing the casings. These compression seals also help to hold the cathode 80 flatly, thereby providing more internal volume that can be used for the anode material.

Battery 10 is further sealed by placing an adhesive 290 in the first and second chambers 230 and 240. The adhesive 290 can be an epoxy potting compound, such as Oxybond 109 Blk (Ellsworth Adhesive Systems (Stone Mountain, Ga.)). The sealant 290 can deposited in the chambers 230 and 240 by a dispenser, such as a syringe.

Other embodiments are within the scope of the following claims.

What is claimed is:

1. A battery comprising an enclosed cartridge having:
   first casing having a wall; and
   a second casing having
   an outer wall having a height, and
   an inner wall having a height less than the height of the outer wall,
   wherein the walls of the second casing are spaced for receiving the wall of the first casing, and the first and second casings form the enclosed cartridge when the casings are assembled together.

2. The battery of claim 1, wherein the wall of the first casing extends entirely around the periphery of the first casing.

3. The battery of claim 1, wherein the outer wall of the second casing extends entirely around the periphery of the second casing.

4. The battery of claim 1, wherein the inner wall of the second casing extends entirely around the second casing.

5. The battery of claim 1, further comprising a cathode disposed in the first casing.

6. The battery of claim 5, wherein the cathode is compressed against an end of the inner wall of the second casing when the casings are assembled together.

7. The battery of claim 6, further comprising a seal disposed between the end of the inner wall of the second casing and the cathode.

8. The battery of claim 1, wherein the first casing includes an area recessed from an interior surface of the first casing and a cathode disposed on the interior surface of the cathode casing.

9. The battery of claim 8, wherein the cathode is compressed against an end of the inner wall of the second casing when the casings are assembled together.

10. The battery of claim 8, further comprising an absorbent layer disposed in the recessed area.

11. The battery of claim 1, further comprising at least one seal between the first casing and the second casing.

12. The battery of claim 11, wherein the at least one seal includes a first seal located between an end of the wall of the first casing and the second casing.

13. The battery of claim 11, wherein the at least one seal includes a seal located between the outer wall of the second casing and the wall of the first casing.

14. The battery of claim 13, wherein the seal located between the outer wall of the second casing and the wall of the first casing comprises an adhesive.

15. The battery of claim 14, wherein the adhesive is an epoxy-potting compound.

16. The battery of claim 13, wherein the casings define a chamber therebetween, and the seal located between the outer wall of the second casing and the wall of the first casing comprises an adhesive disposed in the chamber.

17. The battery of claim 16, further comprising a tab extending through the chamber.

18. The battery of claim 1, wherein the first casing includes a projection on an end of the wall.

19. The battery of claim 1 wherein the battery is a metal-air battery.

20. The battery of claim 1 wherein the battery is a zinc-air battery.

21. The battery of claim 1, wherein the battery is prismatic.

22. The battery of claim 1, wherein the battery is shaped as a rectangular prism.

23. The battery of claim 1, wherein the casings include a thermoplastic polymer.

24. The battery of claim 1, wherein one or more of the walls is integrally formed with the first or second casing.

25. The battery of claim 1, wherein the inner wall forms a compressive seal with an electrode in the cartridge when the casings are assembled together.

26. An enclosed cartridge comprising:
   a first casing having a wall; and
   a second casing having
      an outer wall having a height, and
      an inner wall having a height less than the height of the outer wall,
   wherein the walls of the second casing are spaced for receiving the wall of the first casing, and the first and second casings form the enclosed cartridge when the casings are assembled together.

27. The cartridge of claim 26, wherein the wall of the first casing extends entirely around the periphery of the first casing.

28. The cartridge of claim 26, wherein the outer wall of the second casing extends entirely around the periphery of the second casing.

29. The cartridge of claim 26, wherein the inner wall of the second casing extends around the second casing.

30. The cartridge of claim 26, wherein the first casing includes a projection on an end of the wall.

31. The cartridge of claim 26, wherein the cartridge is prismatic.

32. The cartridge of claim 31, wherein the cartridge is shaped as a rectangular prism.

33. The cartridge of claim 26, wherein t he cartridge includes a thermnoplastic polymer.

34. The cartridge of claim 26, further comprising at least one seal between the first casing and second casing.

35. The cartridge of claim 34, wherein the at least one seal includes a first seal located between an end of the wall of the first casing and the second casing.

36. The cartridge of claim 34, wherein the at least one seal is an ultrasonically welded seal.

37. The cartridge of claim 34, wherein the at least one seal includes a second seal located in a channel between the outer wall of the second casing and the wall of the first casing.

38. The cartridge of claim 26, wherein one or more of the walls is integrally formed with the first or second casing.

39. The cartridge of claim 26, wherein the inner wall forms a compressive seal with an electrode in the cartridge when the casings are assembled together.

40. The cartridge of claim 26, wherein the first casing further includes a first surface of the cartridge, and the second casing further includes a second surface of the cartridge opposed to the first surface.

41. An enclosed battery cartridge, comprising:
   a first casing having a first wall;
   a second casing having a second wall including an edge, the second and first casings forming the enclosed cartridge when assembled together; and
   an electrode disposed in the first casing,
   wherein the edge of the second wall contacts the electrode when the casings are assembled together.

42. The cartridge of claim 41, further comprising a seal between the first and second casings.

43. The cartridge of claim 42, wherein the seal comprises an adhesive.

44. The cartridge of claim 42, wherein the second wall comprises a projection capable of forming the seal with the first casing.

45. The cartridge of claim 41, wherein the second casing further comprises a third wall, and the second and third walls are spaced for receiving the first wall.

46. The cartridge of claim 41, wherein the first wall extends around the periphery of the first casing.

47. The cartridge of claim 41, wherein the second wall extends around the periphery of the second casing.

48. The cartridge of claim 41, wherein the first wall is integrally formed with the first casing.

49. The cartridge of claim 41, wherein the second wall is integrally formed with the second casing.

50. The cartridge of claim 41, wherein the first or second casing comprises stacking projections adapted to engage with corresponding stacking projections of a second cartridge.

51. The cartridge of claim 41, wherein the first casing further includes a first surface of the cartridge, and the second casing further includes a second surface of the cartridge opposed to the first surface.

52. The cartridge of claim 41, wherein the edge of second wall extends around a periphery of the second casing.

* * * * *

UNITED STATES PATENT AND TRADEMARK OFFICE
CERTIFICATE OF CORRECTION

PATENT NO. : 6,461,763 B1
DATED : October 8, 2002
INVENTOR(S) : John D. Witzigreuter and Christopher S. Pedicini It is certified that error appears in the above-identified patent and that said Letters Patent is hereby corrected as shown below:

Title page,
Item [56], References Cited, U.S. PATENT DOCUMENTS, delete "7/1958" and insert -- 2/1957 --; and delete "4,904,559" and insert -- 4,904,550 --.

Column 7,
Line 51, delete "t he" and insert -- the --.
Line 52, delete "thermnoplastic" and insert -- thermoplastic --.

Signed and Sealed this

Seventh Day of January, 2003

JAMES E. ROGAN
*Director of the United States Patent and Trademark Office*